United States Patent
Zhang et al.

(10) Patent No.: US 12,314,213 B2
(45) Date of Patent: May 27, 2025

(54) SYSTEM-ON-CHIP AND METHOD FOR MANAGING WORKING MODE THEREOF, AND SMART WEARABLE DEVICE

(71) Applicant: SPREADTRUM COMMUNICATIONS (SHANGHAI) CO., LTD., Shanghai (CN)

(72) Inventors: Huimin Zhang, Shanghai (CN); Guoming Rao, Shanghai (CN); Zhengfei Xiao, Shanghai (CN); Bo Chen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 105 days.

(21) Appl. No.: 18/043,665

(22) PCT Filed: Aug. 26, 2021

(86) PCT No.: PCT/CN2021/114648
§ 371 (c)(1),
(2) Date: Mar. 1, 2023

(87) PCT Pub. No.: WO2022/048485
PCT Pub. Date: Mar. 10, 2022

(65) Prior Publication Data
US 2023/0385229 A1    Nov. 30, 2023

(30) Foreign Application Priority Data
Sep. 2, 2020    (CN) .......................... 202010911234.7

(51) Int. Cl.
*G06F 15/78* (2006.01)
*G06F 1/3287* (2019.01)

(52) U.S. Cl.
CPC ........ *G06F 15/7807* (2013.01); *G06F 1/3287* (2013.01)

(58) Field of Classification Search
CPC .... G06F 1/3287; G06F 1/3209; G06F 1/3215; G06F 1/3228; G06F 1/3243; G06F 1/3278; G06F 1/329; G06F 15/7807; Y02D 10/00
See application file for complete search history.

(56) References Cited

U.S. PATENT DOCUMENTS

| 8,667,198 | B2 * | 3/2014 | de Cesare | G06F 13/24 |
| | | | | 710/269 |
| 10,416,750 | B2 * | 9/2019 | Black | G06F 1/3293 |

(Continued)

FOREIGN PATENT DOCUMENTS

| CN | 101598968 A | 12/2009 |
| CN | 101727171 A | 6/2010 |

(Continued)

OTHER PUBLICATIONS

Nov. 22, 2021 International Search Report issued in International Patent Application No. PCT/CN2021/114648 with English language translation.

(Continued)

*Primary Examiner* — Seokjin Kim
(74) *Attorney, Agent, or Firm* — MH2 Technology Law Group LLP

(57) ABSTRACT

Disclosed are a system-on-chip and a method for managing a working mode thereof, and a smart wearable device. The method comprises the following steps: in a working mode, a master control subsystem controlling a functional subsystem to implement a corresponding function, and responding to interrupt signals of the functional subsystem and a secondary control subsystem; in a dormant mode, the secondary control subsystem responding to the interrupt signal of the (Continued)

functional subsystem, and the master control subsystem prohibiting responding to the interrupt signal of the functional subsystem; and in an ultra-low power consumption mode, the master subsystem being powered off, and the secondary control subsystem responding to the interrupt signal of the functional subsystem. In the present disclosure, on the premise of meeting a normal function requirement of the system-on-chip, the power consumption of the system-on-chip is reduced to the greatest possible extent.

18 Claims, 2 Drawing Sheets

(56) References Cited

U.S. PATENT DOCUMENTS

| | | | |
|---|---|---|---|
| 2008/0077816 A1* | 3/2008 | Ravichandran | G06F 1/3287 713/324 |
| 2009/0259861 A1* | 10/2009 | Tune | G06F 1/3203 713/320 |
| 2009/0282278 A1 | 11/2009 | Satoh | |
| 2010/0083020 A1 | 4/2010 | Suzuki | |
| 2010/0205467 A1 | 8/2010 | Park | |
| 2013/0046915 A1* | 2/2013 | Kothari | H03L 7/097 710/317 |
| 2013/0179710 A1 | 7/2013 | Chang | |
| 2014/0059365 A1* | 2/2014 | Heo | G06F 1/3215 713/320 |
| 2014/0068289 A1 | 3/2014 | Beck | |
| 2016/0077916 A1* | 3/2016 | Shabel | G06F 1/3215 714/22 |
| 2016/0132097 A1* | 5/2016 | Gainey | G06F 1/32 713/323 |
| 2016/0216752 A1* | 7/2016 | Kim | G06F 1/324 |
| 2017/0308155 A1 | 10/2017 | Lu et al. | |
| 2019/0094949 A1* | 3/2019 | Kurian | G06F 1/3296 |
| 2019/0155368 A1* | 5/2019 | Branover | G06F 1/3287 |
| 2021/0157390 A1* | 5/2021 | Yardi | G06F 3/014 |

FOREIGN PATENT DOCUMENTS

| | | |
|---|---|---|
| CN | 104375623 A | 2/2015 |
| CN | 105511584 A | 4/2016 |
| CN | 105573463 A | 5/2016 |
| CN | 106200853 A | 12/2016 |
| CN | 106556424 A | 4/2017 |
| CN | 110908496 A | 3/2020 |
| CN | 112000216 A | 11/2020 |

OTHER PUBLICATIONS

Nov. 22, 2021 Written Opinion of the International Searching Authority issued in International Patent Application No. PCT/CN2021/114648 with English language translation.

Nov. 1, 2021 First Office Action issued in Chinese Priority Application No. 202010911234.7 with English language translation.

Oct. 25, 2021 First Search Report issued in Chinese Priority Application No. 202010911234.7 with English language translation.

Apr. 25, 2022 Second Office Action issued in Chinese Priority Application No. 202010911234.7 with English language translation.

Apr. 14, 2022 Supplementary Search Report issued in Chinese Priority Application No. 202010911234.7 with English language translation.

International Search Report dated Nov. 22, 2021, PCT Application No. PCT/CN2021/114648, 6 pages (including English translation).

* cited by examiner

SYSTEM-ON-CHIP AND METHOD FOR MANAGING WORKING MODE THEREOF, AND SMART WEARABLE DEVICE

CROSS REFERENCE TO RELATED APPLICATIONS

The present application is a U.S. National Stage of International Application No. PCT/CN2021/114648 filed on Aug. 26, 2021, which claims the priority of Chinese patent application 202010911234.7 filed on Sep. 2, 2020. The contents of the Chinese patent application are incorporated herein by reference in their entireties.

TECHNICAL FIELD

The present disclosure relates to the field of chip technology, and more particularly, to a system-on-chip (SoC) and a method for managing working mode thereof, and smart wearable device.

BACKGROUND

Smart wearable equipment is the application of wearable technology for smart design of everyday wear, development of wearable equipment, such as watches, bracelets, eyeglasses, clothing, etc. Herein, smart watch is the most widely used type of smart wearable equipment.

In the product implementation of the smart watch, there are currently two methods for saving power consumption: firstly, using AOD (Always ON Display) technology to display part of the screen area after the smart watch screen is off, so as to achieve the purpose of low power consumption and power saving; second, the temporarily unused subsystems going into dormant mode, consuming only standby current. Due to the limitation of physical size, smart watches often cannot be loaded with batteries with a slightly larger capacity, and users often expect that smart watches can be charged only once a week or even two weeks due to the convenience of wearing the smart watches, but the above-mentioned two methods for saving power consumption still cannot meet users' requirements for long standby and long endurance of smart watches.

Content of the Present Invention

The technical problem to be solved in the present disclosure is for overcoming the defect that the existing technology for saving power consumption still cannot meet users' requirements. A system-on-chip and a method for managing working mode thereof, and smart wearable device are provided.

The present disclosure solves the above-mentioned technical problems through the following technical solutions.

A first aspect of the present disclosure provides a method for managing a working mode of a system-on-chip, wherein the system-on-chip comprises a master control subsystem, a secondary control subsystem and a plurality of functional subsystems; and the method comprises the following steps:
in a working mode, the master control subsystem controls the functional subsystem to implement a corresponding function, and responds to interrupt signals of the functional subsystem and the secondary control subsystem;
in a dormant mode, the secondary control subsystem responds to the interrupt signal of the functional subsystem, and the master control subsystem prohibits responding to the interrupt signal of the functional subsystem;
in an ultra-low power consumption mode, the master control subsystem is powered off, and the secondary control subsystem responds to the interrupt signal of the functional subsystem;
in the working mode, if the master control subsystem does not receive data sent by any functional subsystem within a period of time, switching to the dormant mode;
in the dormant mode, if the secondary control subsystem detects the interrupt signal of the functional subsystem, switching to the working mode, and if the interrupt signal of the functional subsystem is not detected and a preset condition is met, switching to the ultra-low power consumption mode; and
in the ultra-low power consumption mode, if the secondary control subsystem detects the interrupt signal of the functional subsystem or the preset condition is not met, controlling the master control subsystem to be powered on and switching to the working mode.

In some embodiments, the method comprises the master control subsystem and the secondary control subsystem being both connected to an external operating device;
in the working mode, if the master control subsystem does not receive data sent by any functional subsystem within a period of time, switching to the dormant mode and replacing same with:
in the working mode, if the master control subsystem does not receive data sent by any functional subsystem or an operation of a user on the external operating device within a period of time, switching to the dormant mode;
in the dormant mode, if the secondary control subsystem detects the interrupt signal of the functional subsystem, switching to the working mode and replacing same with:
in the dormant mode, if the secondary control subsystem detects the interrupt signal of the functional subsystem or an operation of a user on the external operating device, switching to the working mode, and if the interrupt signal of the functional subsystem and the operation of the user on the external operating device are not detected and the preset condition is met, switching to the ultra-low power consumption mode;
in the ultra-low power consumption mode, if the secondary control subsystem detects the interrupt signal of the functional subsystem or the preset condition is not met, then controlling the master control subsystem to be powered on, and switching to the working mode, and replacing same with:
in the ultra-low power consumption mode, if the secondary control subsystem detects the interrupt signal of the functional subsystem or an operation of a user on the external operating device or the preset condition is not met, then controlling the master control subsystem to be powered on and switching to the working mode.

In some embodiments, the preset condition is a system time reaching a preset time.

In some embodiments, the secondary control subsystem is connected to an external sensor, and the method further comprises:
the secondary control subsystem receiving detection data of the external sensor.

In some embodiments, the method further comprises:
in the ultra-low power consumption mode, if the secondary control subsystem detects that the detection data is abnormal, controlling the master control subsystem to be powered on, and switching to the working mode.

In some embodiments, the preset condition is that the detection data is below a certain value.

A second aspect of the present disclosure provides a system-on-chip, comprising a master control subsystem, a secondary control subsystem and a plurality of functional subsystems;

in the working mode, the master control subsystem being configured to control the functional subsystem to implement a corresponding function, and to respond to interrupt signals of the functional subsystem and the secondary control subsystem;

in the dormant mode, the secondary control subsystem being configured to respond to the interrupt signal of the functional subsystem, and the master control subsystem being configured to prohibit responding to the interrupt signal of the functional subsystem;

in the ultra-low power consumption mode, the master control subsystem being configured to be powered off, and the secondary control subsystem being configured to respond to the interrupt signal of the functional subsystem;

in the working mode, the master control subsystem being configured to switch to the dormant mode if no data sent by any functional subsystem is received within a period of time;

in the dormant mode, the secondary control subsystem being configured to switch to the working mode if the interrupt signal of the functional subsystem is detected, and to switch to the ultra-low power consumption mode if the interrupt signal of the functional subsystem is not detected and a preset condition is met; and in the ultra-low power consumption mode, the secondary control subsystem being configured to control the master control subsystem to be powered on and to switch to the working mode if the interrupt signal of the functional subsystem is detected or the preset condition is not met.

In some embodiments, the master control subsystem and the secondary control subsystem are both connected to an external operating device;

in the working mode, the master control subsystem is configured to switch to the dormant mode if no data sent by any functional subsystem or an operation of a user on the external operating device is received within a period of time;

in the dormant mode, the secondary control subsystem is configured to switch to the working mode if the interrupt signal of the functional subsystem or an operation of a user on the external operating device is detected, and to switch to the ultra-low power consumption mode if the interrupt signal of the functional subsystem and an operation of a user on the external operating device are not detected and the preset condition is met; and in the ultra-low power consumption mode, the secondary control subsystem is configured to control the master control subsystem to be powered on and to switch to the working mode if the interrupt signal of the functional subsystem or an operation of a user on the external operating device is detected or the preset condition is not met.

In some embodiments, the secondary control subsystem is connected to an external sensor, and the secondary control subsystem is configured to receive detection data of the external sensor.

A third aspect of the present disclosure provides a smart wearable device, comprising the system-on-chip as described by the second aspect.

The present disclosure has the following advantageous effects. The master control subsystem and the secondary control subsystem alternately respond to the interrupt signal of the functional subsystem, and provide three modes for the system-on-chip, specifically a working mode, a dormant mode and an ultra-low power consumption mode, so as to save the power consumption of the system-on-chip to the maximum extent on the premise of meeting the normal functional requirements of the system-on-chip.

DETAILED DESCRIPTION OF THE PREFERRED EMBODIMENT

The present disclosure is further illustrated by the following embodiments, which are not to be construed as limiting the disclosure to the scope of the described embodiments.

Embodiment 1

Figure 1:
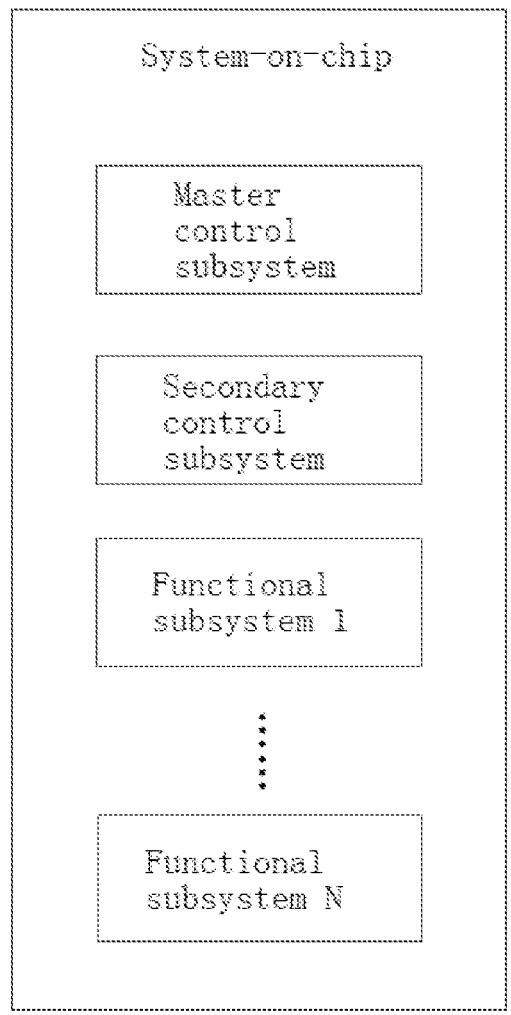
FIG. 1 is a schematic diagram showing a structure of a system-on-chip according to Embodiment 1 of the present disclosure.

FIG. 1 is a structural diagram for illustrating a system-on-chip. The method for managing a working mode of a system-on-chip provided in the present embodiment can be applied to the system-on-chip shown in FIG. 1. As shown in FIG. 1, the system-on-chip includes a master control subsystem, a secondary control subsystem, and a plurality of functional subsystems, and the system-on-chip configures the master control subsystem, the secondary control subsystem, and the plurality of functional subsystems to execute different functions. The master control subsystem and the secondary control subsystem are respectively connected to the functional subsystems via an interrupt line, and the master control subsystem and the secondary control subsystem are connected via an interrupt line.

Figure 2:
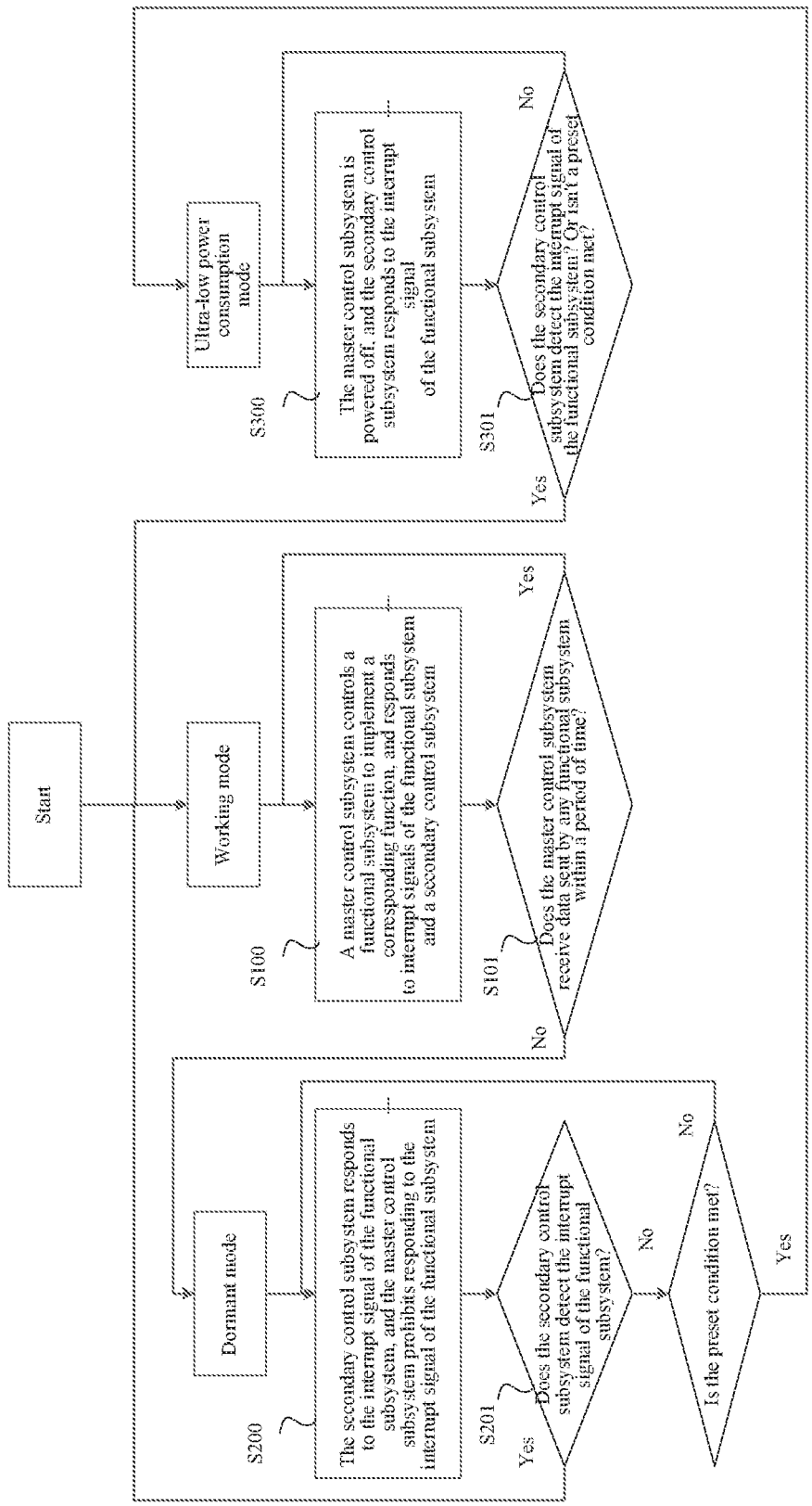
FIG. 2 is a flowchart of a method for managing a working mode of a system-on-chip according to Embodiment 1 of the present disclosure.

The present embodiment provides a method for managing a working mode of a system-on-chip as shown in FIG. 2.

In the working mode, the following steps are performed:

Step S100: the master control subsystem controls the functional subsystem to implement a corresponding function, and responds to interrupt signals of the functional subsystem and the secondary control subsystem.

In this embodiment, different functional subsystems are used for realizing different functions, and the functional subsystems are only turned on to operate when needed, and enter a dormant state when not needed, only maintaining a weak standby current or even being powered off, so as to completely save power consumption. For example, the wireless Modem subsystem includes a wireless Modem for implementing functions of answering/placing calls, mobile data networks, etc. Wireless Modem generally consists of baseband processing, modulation and demodulation, signal amplification and filtering, equalization, etc. and is used for wireless transmission of digital signals for data communication over analog channels with limited bandwidth. The Bluetooth subsystem is used for performing wireless communication function with an external device within a short distance. The Wi-Fi (wireless communication technology) subsystem is used to implement wireless internet access function. The GPS (Global Positioning System) subsystem is used to realize the functions of real-time positioning and navigation on a global scale. The camera subsystem includes a camera head for capturing still images or video.

Step S101: judging whether the master control subsystem receives data sent by any functional subsystem within a period of time, and if so, returning to step S100, and if not, switching to the dormant mode. Here, the period of time may be set as the case may be, for example, 1 minute.

In the dormant mode, the following steps are performed.

Step S200: the secondary control subsystem responds to the interrupt signal of the functional subsystem, and the master control subsystem prohibits responding to the interrupt signal of the functional subsystem. In one example of an implementation, an interrupt port connecting the master control subsystem to each functional subsystem is disabled from enabling, thereby disabling the master control subsystem from responding to interrupt signals sent by each functional subsystem.

Step S201: judging whether the secondary control subsystem detects the interrupt signal of the functional subsystem, if yes, switching to the working mode, and if no, performing step S202:

Step S202: judging whether the preset condition is met, if yes, switching to the ultra-low power consumption mode, and if no, returning to step S200.

In an alternative embodiment, the preset condition is that the system time reaches a preset time. In one specific example, the preset time is 2:00 a.m. In the dormant mode, if the system time reaches 2:00 a.m., the system-on-chip is switched to the ultra-low power consumption mode.

In an alternative embodiment, the secondary control subsystem is connected to an external sensor, and the method further comprises that the secondary control subsystem receives detection data of the external sensor.

In another alternative embodiment, the preset condition is that the detection data of the external sensor is below a certain value. In a specific example, the secondary control subsystem is connected to a heart rate sensor and the system-on-chip is switched to the ultra-low power consumption mode if the heart rate data detected by the heart rate sensor is less than 60 beats per minute.

In the ultra low power consumption mode, the following steps are performed:

Step S300: the master control subsystem is powered off, and the secondary control subsystem responds to the interrupt signal of the functional subsystem.

In an alternative embodiment of step S300, in order to save more power, the master control subsystem first controls part of the functional subsystems to be powered off, e.g. outputs a preset level to its power domain, and then power down itself. In one example of the ultra-low power consumption mode, the wireless Modem subsystem is in a power down state, i.e. unable to make/receive calls.

In an alternative embodiment, the primary control subsystem, the secondary control subsystem and the functional subsystem each have separate power domains, i.e. each subsystem can be powered up or powered off independently from each other. In one specific example, the master control subsystem outputs a preset level signal to the power domain of the functional subsystem to control the powering on or powering off of the functional subsystem. In another specific example, the secondary control subsystem outputs a preset level signal to the power domain of the master control subsystem to control the powering on of the master control subsystem.

Step S301: judging whether the secondary control subsystem detects the interrupt signal of the functional subsystem or the preset condition is not met, if yes, controlling the master control subsystem to be powered on, and switching to the working mode, and if no, returning to step S300.

In an alternative embodiment, in the ultra-low power consumption mode, if the secondary control subsystem detects an abnormality in the detection data of the external sensor, the secondary control subsystem is controlled to be powered on and the system-on-chip is switched to the working mode. In a specific example, the secondary control subsystem is connected to a heart rate sensor, and if the secondary control subsystem detects more than 120 times per minute of heart rate data, the secondary control subsystem is powered on and the system-on-chip is switched to the working mode.

In an alternative embodiment, both the master control subsystem and the secondary control subsystem are connected to an external operating device.

In this embodiment, the step S101 may also be: judging whether the master control subsystem receives data sent by any functional subsystem or an operation of a user on the external operating device within a period of time, and if so, returning to step S100, and if not, switching to the dormant mode.

In this embodiment, the step S201 may also be: judging whether the secondary control subsystem detects the interrupt signal of the functional subsystem or an operation of a user on the external operating device, if so, switching to the working mode, and if not, performing step S202.

In this embodiment, the step S301 may also be: judging whether the secondary control subsystem detects the interrupt signal of the functional subsystem or an operation of a user on the external operating device or the preset condition is not met, if yes, controlling the master control subsystem to be powered on, and switching to the working mode, and if no, returning to step S300.

In one example, the external operating device includes a touch screen on which a user may perform operations such as click, touch, slide, etc. In the working mode, the master control subsystem is used for receiving the touch operation of the user on the touch screen, and in the dormant mode and the ultra-low power consumption mode, the secondary control subsystem is used for receiving the touch operation of the user on the touch screen.

In another example, the external operating device further comprises a key, and the user may perform one press, two presses, a short press or a long press on the key. In the working mode, the master control subsystem is used for receiving a user's operation on the key, and in the dormant mode and the ultra-low power consumption mode, the secondary control subsystem is used for receiving a user's operation on the key.

In this embodiment, the master control subsystem can complete complex multimedia system applications and can completely respond to user operations and even execute complex user applications. The secondary control subsystem is mainly used to control the AOD display and various external sensors when the master control subsystem is dormant. Therefore, the main frequency, memory consumption and power consumption of the MCU (Micro Control Unit) in the master control subsystem are higher than the main frequency, memory consumption and power consumption of the MCU in the secondary control subsystem.

In this embodiment, the master control subsystem and the secondary control subsystem alternately respond to the interrupt signal of the functional subsystem, and provide three modes for the system-on-chip, specifically a working mode, a dormant mode and an ultra-low power consumption mode, so as to save the power consumption of the system-on-chip to the maximum extent on the premise of meeting the normal functional requirements of the system-on-chip.

Embodiment 2

The present embodiment provides a system-on-chip comprising a master control subsystem, a secondary control subsystem, and a plurality of functional subsystems. Herein, the system-on-chip configures the master control subsystem, the secondary control subsystem, and the plurality of functional subsystems to execute different functions.

In a working mode, the master control subsystem is configured to control the functional subsystem to implement a corresponding function and to respond to interrupt signals of the functional subsystem and the secondary control subsystem.

In a dormant mode, the secondary control subsystem is configured to respond to the interrupt signal of the functional subsystem, and the master control subsystem is configured to prohibit responding to the interrupt signal of the functional subsystem.

In an ultra-low power consumption mode, the master control subsystem is configured to be powered off and the secondary control subsystem is configured to respond to the interrupt signal from the functional subsystem.

In the working mode, the master control subsystem is configured to switch to the dormant mode if no data sent by any of the functional subsystems is received within a period of time.

In the dormant mode, the secondary control subsystem is configured to switch to the working mode if the interrupt signal of the functional subsystem is detected, and to switch to the ultra-low power consumption mode if the interrupt signal of the functional subsystem is not detected and a preset condition is met.

In the ultra-low power consumption mode, the secondary control subsystem is configured to control the master control subsystem to be powered on and the system-on-chip is switched to the working mode if the interrupt signal of the functional subsystem is detected or the preset condition is not met.

In an alternative embodiment, both the master control subsystem and the secondary control subsystem are connected to an external operating device.

In the working mode, the master control subsystem is configured to switch to the dormant mode if no data sent by any functional subsystem or user operation on the external operating device is received for a period of time.

In the dormant mode, the secondary control subsystem is configured to switch to the working mode if the interrupt signal of the functional subsystem or an operation of a user on the external operating device is detected, and to switch to the ultra-low power consumption mode if the interrupt signal of the functional subsystem and the operation of the user on the external operating device are not detected and a preset condition is met.

In the ultra-low power consumption mode, the secondary control subsystem is configured to control the master control subsystem to be powered on and the system-on-chip is switched to the working mode if the interrupt signal of the functional subsystem or an operation of a user on the external operating device is detected or the preset condition is not met.

In an alternative embodiment, the preset condition is that the system time reaches a preset time.

In an alternative embodiment, the secondary control subsystem is connected to an external sensor, the secondary control subsystem being configured to receive detection data of the external sensor.

In another alternative embodiment, the preset condition is that the detection data of the external sensor is below a certain value.

In an alternative embodiment, in the ultra-low power consumption mode, if the secondary control subsystem detects an abnormality in the detection data of the external sensor, the secondary control subsystem is controlled to be powered on and the system-on-chip is switched to the working mode.

In this embodiment, the master control subsystem and the secondary control subsystem alternately respond to the interrupt signal of the functional subsystem, and provide three modes for the system-on-chip, specifically a working mode, a dormant mode and an ultra-low power consumption mode, so as to save the power consumption of the system-on-chip to the maximum extent on the premise of meeting the normal functional requirements of the system-on-chip.

In an alternative embodiment, the system-on-chip further comprises SRAM (Static Random-Access Memory), DRAM (Dynamic Random Access Memory), ROM (Read-Only Memory) and a power management chip. In a specific example, the SRAM, the master control subsystem, the secondary control subsystem and a plurality of functional subsystems are integrated in one chip, and are encapsulated with the DRAM, the ROM and the power management chip via SIP, resulting in a system-on-chip of the present embodiment. By integrating subsystems and memory into one chip, not only can power consumption and cost be reduced, but also the space required by the PCB (Printed Circuit Board) can be reduced. The SIP package is an electronic device package solution, which integrates a plurality of functional chips, including functional chips such as a processor and a memory, into one package so as to realize a substantially complete function.

In a specific example, firstly, an ePoP (Embedded Package on Package) packaging process is used, a ROM and a DRAM are stacked on a chip integrating a SRAM, a master control subsystem, a secondary control subsystem and all functional subsystems, and then a FCCSP (FlipChip Chip Scale Package) packaging process is used to integrate same with a power management chip, thereby obtaining the system-on-chip of the present embodiment.

In an alternative embodiment, the system-on-chip has an embedded RTOS operating system. Different from smart operating systems such as Android, Windows and IOS, RTOS operating system is a light-weight microkernel operating system, which can be applied to a MCU controller and provides a response speed of microsecond level, belonging to an ultra-low power consumption operating system. Each subsystem of the system-on-chip includes a processor, such as a lightweight MCU. In one example, each MCU has an embedded RTOS operating system. In another example, a portion of the MCU on the system-on-chip has a RTOS operating system embedded therein. It can be specifically designed according to the resources required by each subsystem to realize different functions, etc. The use of a lightweight MCU and an ultra-low power consumption RTOS operating system in the present embodiment can further reduce the power consumption of the system-on-chip.

Embodiment 3

This embodiment provides a smart wearable device comprising a system-on-chip as described in embodiment 2.

In alternative embodiments, the smart wearable device further comprises a touch screen and a plurality of sensors, wherein the touch screen and the sensors are each electrically connected to the system-on-chip. In this embodiment, the user can operate on the content displayed by the smart wearable device via the touch screen, and the smart wearable device responds differently based on different operations of the user.

In alternative embodiments, the sensors include heart rate sensors, acceleration sensors, gyroscope sensors, and the like. The secondary control subsystem in the system-on-chip is used for realizing the functions of Sensor Hub, specifically including real-time control of sensors, data fusion of different types of sensors is performed to realize the functions that can be realized by combining multiple types of sensor data, etc.

In an alternative embodiment, the smart wearable device is a smart watch, such as an adult smart watch, a child smart watch, an elderly smart watch, etc.

In alternative embodiments, the smart wearable device may also be a smart bracelet, smart eyeglasses, smart apparel, etc.

While particular embodiments of the present disclosure have been described above, it will be understood by those skilled in the art that these are merely illustrative and that various changes or modifications may be made to these embodiments without departing from the principles and spirit of the present disclosure. Accordingly, the protection sought herein is as set forth in the claims below.

What is claimed is:

1. A method for managing a working mode of a system-on-chip, wherein the system-on-chip comprises a master control subsystem, a secondary control subsystem and a plurality of functional subsystems; and the method comprises:
   configuring the master control subsystem to control at least one of the plurality of function subsystems to implement a corresponding function in a working mode, and to respond to interrupt signals of at least one of the plurality of function subsystems and the secondary control subsystem in the working mode;
   configuring the secondary control subsystem to respond to the interrupt signal of at least one of the plurality of function subsystems in a dormant mode, and the master control subsystem to prohibit responding to the interrupt signal of at least one of the plurality of function subsystems in the dormant mode;
   configuring the master control subsystem to be powered off in an ultra-low power consumption mode, and the secondary control subsystem to respond to the interrupt signal of at least one of the plurality of function subsystems in the ultra-low power consumption mode;
   switching from the working mode to the dormant mode in response to the master control subsystem not receiving data sent by any functional subsystem within a period of time;
   switching from the dormant mode to the working mode in response to the secondary control subsystem detecting the interrupt signal of at least one of the plurality of function subsystems; switching from the dormant mode to the ultra-low power consumption mode in response to the secondary control subsystem not detecting the interrupt signal of at least one of the plurality of function subsystems and a preset condition being met; and
   controlling the master control subsystem to be powered on and switching from the ultra-low power consumption mode to the working mode in response to the secondary control subsystem detecting the interrupt signal of at least one of the plurality of function subsystems or the preset condition being met.

2. The method as claimed in claim 1, wherein the master control subsystem and the secondary control subsystem are both connected to an external operating device; the method further comprises:
   switching from the working mode to the dormant mode in response to the master control subsystem not receiving data sent by any functional subsystem or an operation of a user on the external operating device within a period of time;
   switching from the dormant mode to the working mode in response to the secondary control subsystem detecting the interrupt signal of at least one of the plurality of function subsystems or an operation of a user on the external operating device;
   switching from the dormant mode to the ultra-low power consumption mode in response to the secondary control subsystem not detecting the interrupt signal of at least one of the plurality of function subsystems and the operation of the user on the external operating device and the preset condition being met; and
   controlling the master control subsystem to be powered on and switching from the ultra-low power consumption mode to the working mode in response to the secondary control subsystem detecting the interrupt signal of at least one of the plurality of function subsystems or an operation of a user on the external operating device or the preset condition being not met.

3. The method as claimed in claim 1, wherein the preset condition is a system time reaching a preset time.

4. The method as claimed in claim 1, wherein the secondary control subsystem is connected to an external sensor, the method further comprises:
   configuring, by the system-on-chip, the secondary control subsystem to receive detection data of the external sensor.

5. The method as claimed in claim 4, wherein, the method further comprises:
   controlling the master control subsystem to be powered on and switching from the ultra-low power consumption mode to the working mode in response to the secondary control subsystem detecting that the detection data is abnormal.

6. The method as claimed in claim 4, wherein the preset condition is that the detection data is below a certain value.

7. A system-on-chip, comprising a master control subsystem, a secondary control subsystem and a plurality of functional subsystems, wherein the system-on-chip is configured to:
   configure the master control subsystem to control at least one of the plurality of function subsystems to implement a corresponding function, and to respond to interrupt signals of at least one of the plurality of function subsystems and the secondary control subsystem in a working mode;

configure the secondary control subsystem to respond to the interrupt signal of at least one of the plurality of function subsystems, and the master control subsystem to prohibit responding to the interrupt signal of at least one of the plurality of function subsystems in a dormant mode;

configure the master control subsystem to be powered off, and the secondary control subsystem to respond to the interrupt signal of at least one of the plurality of function subsystems in an ultra-low power consumption mode;

switch from the working mode to the dormant mode in response to the master control subsystem not receiving data sent by any functional subsystem within a period of time;

switch from the dormant mode to the working mode in response to the secondary control subsystem detecting the interrupt signal of at least one of the plurality of function subsystems;

switch from the dormant mode to the ultra-low power consumption mode in response to the secondary control subsystem not detecting the interrupt signal of at least one of the plurality of function subsystems and a preset condition being met; and control the master control subsystem to be powered on and switch from the ultra-low power consumption mode to the working mode in response to the secondary control subsystem detecting the interrupt signal of at least one of the plurality of function subsystems or the preset condition being not met.

8. The system-on-chip as claimed in claim 7, wherein the master control subsystem and the secondary control subsystem are both connected to an external operating device; the system-on-chip is configured to:

switch from the working mode to the dormant mode in response to the master control subsystem not receiving data sent by any functional subsystem or an operation of a user on the external operating device within a period of time;

switch from the dormant mode to the working mode in response to the secondary control subsystem detecting the interrupt signal of at least one of the plurality of function subsystems or an operation of a user on the external operating device; switch from the dormant mode to the ultra-low power consumption mode in response to the secondary control subsystem not detecting the interrupt signal of at least one of the plurality of function subsystems and an operation of a user on the external operating device and the preset condition being met; and control the master control subsystem to be powered on and switch from the ultra-low power consumption mode to the working mode in response to the secondary control subsystem detecting the interrupt signal of at least one of the plurality of function subsystems or an operation of a user on the external operating device or the preset condition being not met.

9. The system-on-chip as claimed in claim 7, wherein the secondary control subsystem is connected to an external sensor, and the secondary control subsystem is configured to receive detection data of the external sensor.

10. The system-on-chip as claimed in claim 7, wherein the preset condition is a system time reaching a preset time.

11. The system-on-chip as claimed in claim 9, wherein the system-on-chip is configured to control the master control subsystem to be powered on and switch from the ultra-low power consumption mode to the working mode in response to the secondary control subsystem detecting that the detection data is abnormal.

12. The system-on-chip as claimed in claim 9, wherein the preset condition is that the detection data is below a certain value.

13. A smart wearable device, comprising a system-on-chip, wherein the system-on-chip comprises a master control subsystem, a secondary control subsystem and a plurality of functional subsystems; and the system-on-chip is configured to:

configure the master control subsystem to control at least one of the plurality of function subsystems to implement a corresponding function, and to respond to interrupt signals of at least one of the plurality of function subsystems and the secondary control subsystem in a working mode;

configure the secondary control subsystem to respond to the interrupt signal of at least one of the plurality of function subsystems, and the master control subsystem to prohibit responding to the interrupt signal of at least one of the plurality of function subsystems in a dormant mode;

configure the master control subsystem to be powered off, and the secondary control subsystem to respond to the interrupt signal of at least one of the plurality of function subsystems in an ultra-low power consumption mode;

switch from the working mode to the dormant mode in response to the master control subsystem not receiving data sent by any functional subsystem within a period of time;

switch from the dormant mode to the working mode in response to the secondary control subsystem detecting the interrupt signal of at least one of the plurality of function subsystems; switch from the dormant mode to the ultra-low power consumption mode in response to the secondary control subsystem not detecting the interrupt signal of at least one of the plurality of function subsystems and a preset condition being met; and control the master control subsystem to be powered on and switch from the ultra-low power consumption mode to the working mode in response to the secondary control subsystem detecting the interrupt signal of at least one of the plurality of function subsystems or the preset condition being not met.

14. The smart wearable device as claimed in claim 13, wherein the master control subsystem and the secondary control subsystem are both connected to an external operating device; and the system-on-chip is configured to:

switch from the working mode to the dormant mode in response to the master control subsystem not receiving data sent by any functional subsystem or an operation of a user on the external operating device within a period of time;

switch from the dormant mode to the working mode in response to the secondary control subsystem detecting the interrupt signal of at least one of the plurality of function subsystems or an operation of a user on the external operating device; switch from the dormant mode to the ultra-low power consumption mode in response to the secondary control subsystem not detecting the interrupt signal of at least one of the plurality of function subsystems and an operation of a user on the external operating device and the preset condition being met; and control the master control subsystem to be powered on and switch from the ultra-low power consumption mode to the working mode in response to the secondary control subsystem detecting the interrupt signal of at least one of the plurality of function subsystems or an operation of a user on the external operating device or the preset condition being not met.

15. The smart wearable device as claimed in claim 13, wherein the secondary control subsystem is connected to an external sensor, and the secondary control subsystem is configured to receive detection data of the external sensor.

16. The smart wearable device as claimed in claim 13, wherein the preset condition is a system time reaching a preset time.

17. The smart wearable device as claimed in claim 15, wherein the system-on-chip is configured to control the master control subsystem to be powered on and switch from the ultra-low power consumption mode to the working mode in response to the secondary control subsystem detecting that the detection data is abnormal.

18. The smart wearable device as claimed in claim 15, wherein the preset condition is that the detection data is below a certain value.

\* \* \* \* \*